United States Patent Office 3,197,432
Patented July 27, 1965

3,197,432
TRANSPARENT RESINOUS ORGANO-
POLYSILOXANES
Harry F. Lamoreaux, Schenectady, N.Y., assignor to General Electric Company, a corporation of New York
No Drawing. Filed July 2, 1962, Ser. No. 206,998
4 Claims. (Cl. 260—46.5)

This application relates to optically clear, thermally stable, solvent-resistant organopolysiloxane materials.

Optically clear, solid synthetic resinous materials have become relatively important as technology has advanced. Synthetic resinous materials with optical clarity have been used as insulation for electrical and electronic components where it has been desirable to insulate and protect the components, but at the same time be able to view the components through the clear synthetic resinous material. These synthetic resinous materials have offered certain advantages in that they are relatively easy to handle and can be cast about almost any type of object and can be formed in almost any shape. These optically clear synthetic resinous materials have also been used as substitutes in optical systems since they can be cast into the desired shape without the necessity for the complicated polishing operations which are necessary for conventional glass elements. Thus, synthetic resinous optical elements have been used as optical elements in lens systems such as microscopes, telescopes and the like, and have also been used in the formation of contact lenses for correcting the vision of humans.

While these prior art optically clear resinous materials have had many advantages, they have also had many disadvantages. Thus, these materials have rarely had any degree of thermal stability, have had poor resistance to organic solvents as well as acids and alkalis, and have not had the desired abrasion resistance or the high electrical strength which is often desired.

The object of the present invention is to provide an optically clear, tough, solid, thermally stable, solvent-resistant, high dielectric strength organopolysiloxane material.

This and other objectives of my invention are accomplished by providing an organopolysiloxane in which each silicon atom is a member of an 8-membered ring of alternate silicon atoms and oxygen atoms, where substantially every silicon atom is attached to one monovalent hydrocarbon radical and substantially every silicon atom is attached to another silicon atom through a divalent alkylene radical containing at least two carbon atoms.

The optically clear organopolysiloxanes of the present invention are prepared by contacting (1) a first cyclotetrasiloxane in which each silicon atom is attached to both one monovalent hydrocarbon radical free of aliphatic unsaturation and to one hydrogen atom with (2) a second cyclotetrasiloxane in which each silicon atom is attached to both one monovalent hydrocarbon radical free of aliphatic unsaturation and to one monovalent hydrocarbon radical containing olefinic unsaturation in the presence of a catalyst which promotes the addition of the silicon-hydrogen linkage of the first cyclotetrasiloxane across the olefinically unsaturated double bonds of the olefinically unsaturated hydrocarbon radical in the second cyclotetrasiloxane.

The cyclotetrasiloxanes employed in the practice of the present invention in which each silicon atom is attached to both a hydrocarbon radical and a hydrogen atom (referred to sometimes hereinafter as "hydrogen tetramer") are well known in the art and can be described by the formula:

(1) 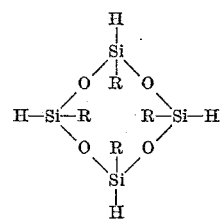

where R represents a monovalent hydrocarbon radical free of aliphatic unsaturation. Each of the four R groups in the cyclotetrasiloxane of Formula 1 can represent the same group or the several R groups can be different. Among the R groups within the scope of Formula 1 can be mentioned, for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl, etc. radicals; cycloalkyl radicals, e.g., cyclohexyl, cycloheptyl, etc. radicals. Preferably, the R radicals are methyl or phenyl radicals or a mixture of methyl and phenyl radicals. The cyclotetrasiloxanes within the scope of Formula 1 can be formed, for example, by the hydrolysis and condensation of organochlorosilanes such as methyldichlorosilane, phenyldichlorosilane, octyldichlorosilane, cyclohexyldichlorosilane, and by the cohydrolysis and cocondensation of a mixture of two or more organochlorosilanes such as by the cohydrolysis and cocondensation of a mixture of methyldichlorosilane and phenyldichlorosilane.

The cyclotetrasiloxanes containing the silicon-bonded monovalent hydrocarbon radicals containing olefinic unsaturation (referred to sometimes hereinafter as "olefinic tetramer") can be represented by the formula:

(2) 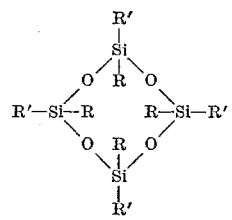

where R is as previously defined and R' is a monovalent hydrocarbon radical containing olefinic unsaturation. Illustrative of the R' radicals within the scope of Formula 2 are, for example, vinyl, allyl, 1-hexenyl, 3-octenyl, etc. radicals. Preferably, the alkenyl radical is vinyl. The cyclotetrasiloxanes within the scope of Formula 2 can be prepared by conventional means such as, for example, by the hydrolysis and condensation of an organoalkenyldichlorosilane such as methylvinyldichlorosilane, phenylallyldichlorosilane, etc. In addition, within the scope of Formula 2 are cyclotetrasiloxanes in which the four R groups represent different groups. Thus, the R groups can represent, for example, both methyl and phenyl groups. Such a cyclotetrasiloxane can be prepared, for example, by the cohydrolysis and cocondensation of a mixture of methylvinyldichlorosilane and phenylvinyldichlorosilane.

As previously mentioned, the cyclotetrasiloxane of Formula 1 is reacted with the cyclotetrasiloxane of Formula 2 by contacting the two cyclotetrasiloxanes in the presence of a catalyst for the addition of silicon-hydrogen bonds across olefinic double bonds. While the precise reaction conditions will depend to a major extent upon the particular catalyst employed, the reaction is generally effected by heating the two cyclotetrasiloxanes to a temperature which can vary from about 30° C. up to the boiling point of the lower boiling of the two cyclotetrasiloxanes. This upper temperature is generally of the order of from about 100 to 125° C. The effect of the reaction is to add each of the silicon-hydrogen linkages of the cyclotetrasiloxane of Formula 1 across the olefinic double bonds of the R' groups of the cyclotetrasiloxane within the scope of Formula 2. Thus, considering the beginning of the reaction, for example, one molecule of a cyclotetrasiloxane within the scope of Formula 1 could react with four molecules of a cyclotetrasiloxane within the scope of Formula 2 which, for purposes of convenience, will be illustrated as a cyclotetrasiloxane in which the R' groups are vinyl. This results in the following structure:

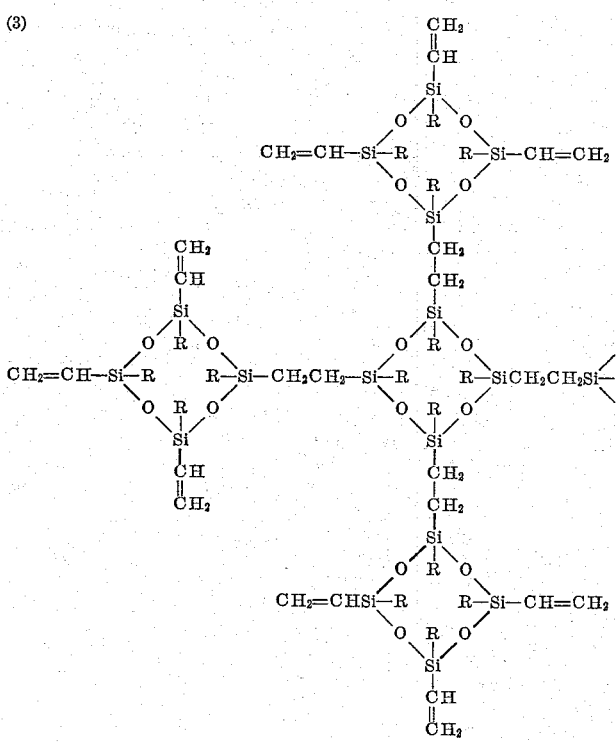

tained. As an illustration of the structure of this polymer during an intermediate stage of growth, reference is made to the following Formula 4 in which each of the squares represent a cyclotetrasiloxane ring with each point of the square representing a silicon atom. For simplicity, the silicon atoms, oxygen atoms and R groups have been omitted from the schematic formula.

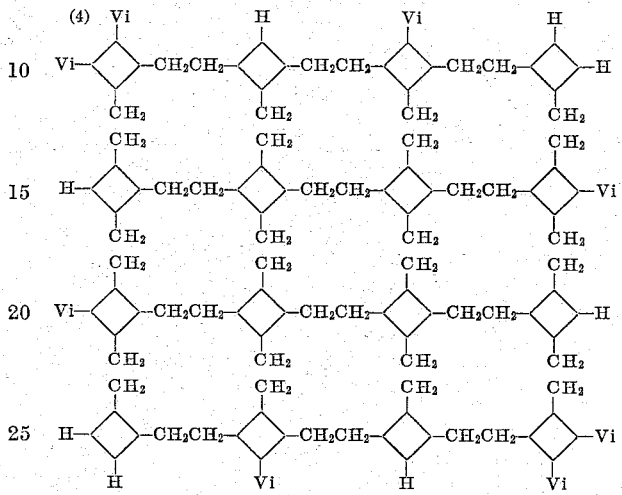

In the structure shown above, the central cyclotetrasiloxane ring is derived from the cyclotetrasiloxane of Formula 1 while the four surrounding cyclotetrasiloxane rings are derived from the cyclotetrasiloxane of Formula 2. The polymer is built up further by the reaction of, for example, four additional molecules of the cyclotetrasiloxane of Formula 1 with, for example, one molecule of the cyclotetrasiloxane of Formula 1 reacting with both the right hand silicon-bonded vinyl group of the upper cyclotetrasiloxane ring shown in Formula 3 and the upper silicon-bonded vinyl group of the right hand cyclotetrasiloxane ring shown in Formula 3. In this fashion, the polymer molecule grows with each cyclotetrasiloxane ring being connected to four other cyclotetrasiloxane rings through a silicon-alkylene-silicon linkage until an optically clear, high molecular weight, hard, polymeric material is obtained.

While Formula 4 shows the polymer of the present invention as a planar material, it is apparent that each of the cyclotetrasiloxane rings, prior to incorporation into the polymer structure, can rotate freely so that instead of actually being a planar material, the molecules which comprise the polymers of the present invention are three dimensional.

From the structure of the polymers of the present invention shown in Formula 4, it is apparent that those cyclotetrasiloxane rings which are at the end of the molecule can contain unreacted silicon-bonded vinyl groups or silicon-bonded hydrogen atoms. Because the molecule must be of a finite molecular weight, only substantially all of the silicon atoms are attached to another silicon atom through a divalent alkylene radical.

From the foregoing description of the specific polymer of Formula 4 it can be seen that the polymers of the present invention are characterized by the formula:

(5)

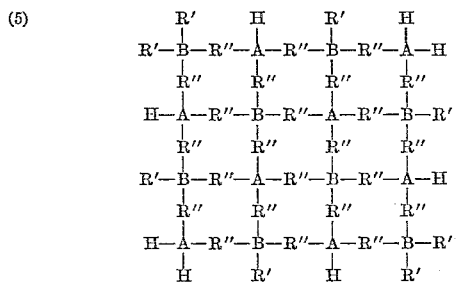

where R' is as previously defined, R'' is a divalent hydrocarbon radical having at least two carbon atoms and which is derived from the addition of the Si—H linkage of the hydrogen tetramer of Formula 1 to the R' radical of the olefinic tetramer of Formula 2 and A represents the cyclotetrasiloxane nucleus derived from the hydrogen tetramer and B represents the cyclotetrasiloxane nucleus derived from the olefinic tetramer, both of which are represented by the formula:

(6)

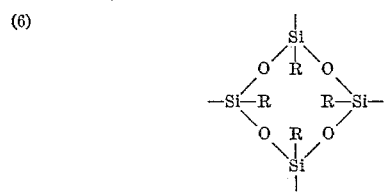

where R is as previously defined.

From the foregoing description of the formation and structure of the organopolysiloxanes of the present invention, it can be seen that these materials are organopolysiloxanes which comprise a plurality of eight membered rings of alternate silicon atoms and oxygen atoms, with each of the silcon atoms being connected to one monovalent hydrocarbon radical free of aliphatic unsaturation, Substantially every silicon atom of one of the eight membered rings is connected to a silicon atom of another of the eight membered rings through a divalent alkylene radical containing at least two carbon atoms. Any valences of silicon not accounted for above are satisfied by a member selected from the class consisting of hydrogen and monovalent hydrocarbon radicals containing olefinic unsaturation.

As previously mentioned, any catalyst which is operative to catalyze the addition of silicon-hydrogen bonds across olefinic double bonds can be employed as a catalyst for preparing the polymeric materials of the present invention. Among the many useful catalysts for this addition reaction is finely divided platinum as disclosed in Patent 2,970,150—Bailey or chloroplatinic acid as disclosed in Patent 2,823,218—Speier et al. However, the preferred catalyst is the catalyst described in my copending application Serial No. 207,076, filed concurrently herewith and assigned to the same assignee as the present invention. This copending application is hereby incorporated by reference into the present application for a description of these preferred catalysts and their method of preparation. Briefly these preferred catalysts are prepared by heating a mixture of chloroplatinic acid with either an alcohol, an ether or an aldehyde at a temperature of about 60 to 80° C. at a reduced pressure until the reaction product has a ratio of from about 2.0 to about 3.5 atoms of chlorine per atom of platinum.

The amount of catalyst employed is a function of the particular catalyst employed and the temperature at which the hydrogen tetramer of Formula 1 is reacted with the olefinic tetramer of Formula 2. Where platinum is employed as a catalyst, the catalyst is generally present in an amount equal to from about $10^{-3}$ to $10^{-5}$ moles of catalyst per mole of the olefinic tetramer within the scope of Formula 2. When chloroplatinic acid is employed, the catalyst is generally used in an amount equal to from about $10^{-4}$ to $10^{-6}$ moles of platinm per mole of the olefinic tetramer within the scope of Formula 3. Where the catalyst of my aforementioned copending application is used, it is employed in sufficient amount to provide from about $10^{-4}$ to $10^{-7}$ moles of platinum per mole of the olefinic tetramer within the scope of Formula 2. Generally, the reaction is effected at a temperature of from about 30 to 120° C. However, with active catalysts such as chloroplatinic acid or the catalyst of my aforementioned copending application, the reaction may be effected at room temperature, e.g., a temperature of around 20 to 25° C.

In effecting the reaction, it is preferable to employ equimolar amounts of the cyclotetrasiloxanes of Formula 1 and Formula 2 since the polymeric materials of the present invention are composed of the reactants in this ratio. However, where it is desired that the polymeric material be terminated substantially completely with either the hydrogen tetramer of Formula 1 or the olefinic tetramer of Formula 2, the desired cyclotetrasiloxane is employed in excess, such as up to about a 10 percent molar excess. The time required for completion of the reaction is, of course, a function of the amount and activity of the catalyst employed, a function of the particular cyclotetrasiloxanes employed and a function of the temperature of the reaction. In general, the reaction can be accomplished in times which very from about 30 minutes at a temperature of about 50° C. to 24 hours or more when room temperature reaction is employed.

The following examples are illustrative of the practice of my invention and are not intended for purposes of limitation.

*Example 1*

A catalyst within the scope of my aforementioned copending application was prepared by dissolving one part by weight of chloroplatinic acid hexahydrate in ten parts of octyl alcohol and heating the solution at 70 to 75° C. at 25 millimeters for 16 hours during which time all water and hydrogen chloride was removed. The pressure was then reduced to 5 millimeters to remove all unreacted octyl alcohol. At the end of this time a product was obtained which was a dark, reddish-brown liquid soluble in alcohols, acetone, benzene, hexane, xylene, toluene and other common solvents. Chemical analysis of this mixture showed it to contain 3.5 atoms of chlorine per atom of platinum and 0.035 gram platinum per gram of the mixture.

An equimolar mixture of 1,3,5,7-tetramethyl-1,3,5,7-tetravinylcyclotetrasiloxane and 1,3,5,7-tetramethyl-1,3,5,7-tetrahydrocyclotetrasiloxane was formed. A sufficient amount of the catalyst prepared above was added to provide $2.5 \times 10^{-6}$ gram atoms of platinum per mole of the vinyl-containing cyclotetrasiloxane. After thoroughly blending the ingredients, the resulting material was allowed to stand at room temperature for about 72 hours until the solution obtained a consistency similar to that of molasses. At this time the viscous solution was heated at 50° C. for ½ hour, during which time it was quickly converted to an optically clear, hard, glass-like polymer. No change in weight or physical appearance occurred when this polymeric material was boiled for 48 hours in acetone, toluene or trichloroethylene. Soaking of a sample of the polymer in concentrated alcoholic potassium hydroxide solution for over two weeks had no visible effect on the cured resin. This polymer was an organopolysiloxane in which each silicon atom was a member of an 8-membered ring of alternate silicon atoms and oxygen atoms with substantially every silicon atom in the polymer being attached to one methyl radical and substantially every silicon atom in the polymer being attached to another silicon atom through an ethylene radical.

*Example 2*

A coated glass tape was prepared by following the procedure of Example 1 up to the point where the mixture became quite viscous. At this time, a glass tape was dipped into the viscous resin solution, the excess solution was allowed to drain off and the coated tape was then heated for 1 hour at 150° C. The resulting tape had a hard, clear, smooth coating and was useful as insulation for a dynamo electric machine. Dielectric strength was determined on another sample of the clear coated resin and was found to be of the order of 1500 volts per mil.

*Example 3*

An equimolar solution was prepared of 1,3,5,7-tetramethyl - 1,3,5,7 - tetraallylcyclotetrasiloxane and 1,5-diphenyl - 3,7 - dimethyl - 1,3,5,7 - tetrahydrocyclotetrasiloxane. To this solution was added an isoamyl alcohol solution of chloroplatinic acid hexahydrate in sufficient amount to provide $1 \times 10^{-4}$ gram atoms of platinum per mole of the allyl-containing cyclotetrasiloxane. This solution was maintained at a temperature of 35° C. until a viscous solution having the consistency of molasses was obtained. This solution was then cast about an electronic circuit board having glass-enclosed electronic tubes and other components mounted thereon and the entire assembly was heated at a temperature of 75° C. for 2 hours, during which time the resinous material was converted to an optically clear, tough, glass-like material through which the circuit board and its components were visible. This polymeric material was an organopolysiloxane in which each silicon atom was a member of an 8-membered ring of alternate silicon atoms and oxygen atoms, substantially every silicon atom was attached to either a methyl radical or a phenyl radical and substantially every silicon atom was atached to another silicon atom through a trimethylene radical.

While the foregoing examples have illustrated certain of the embodiments of the present invention, it should be understood that wide variation is possible with respect to the R groups of Formula 1 and Formula 2 and with regard to the R' groups of Formula 2. Any variation of these R groups results in a polymer within the scope of the present invention when the cyclotetrasiloxane of Formula 1 is reacted with the cyclotetrasiloxane of Formula 2 with one of the suitable types of catalysts heretofore described.

It should also be understood that the composition of the present invention can contain various fillers such as carbon black, zinc oxide, clay, whiting, slate flour, finely divided silica, such as fume silica, silica aerogel, precipitated silica, etc. These fillers can be incorporated in amounts of from 10 to 200 or more parts by weight per 100 parts of the organopolysiloxane materials of the present invention. These fillers can be incorporated into the cyclotetrasiloxane starting materials or added subsequent to the beginning of the reaction employed but before the reaction passes beyond the viscous fluid stage. The presence of fillers interferes with the optical clarity of the products, but increases their toughness.

What I claim as new and desire to secure by Letters Patent of the United States is:

1. An optically clear, solid, resinous, thermally stable, solvent resistant organopolysiloxane comprising a plurality of eight membered rings of alternate silicon atoms and oxygen atoms, each of said silicon atoms being connected to one monovalent hydrocarbon radical free of aliphatic unsaturation and substantially every silicon atom of one of said eight membered rings being connected to a silicon atom of another of said eight membered rings through a divalent alkylene radical containing at least two carbon atoms, with any valences of silicon not accounted for above being satisfied by a member selected from the class consisting of hydrogen and monovalent hydrocarbon radicals containing olefinic unsaturation.

2. An optically clear, solid, resinous, thermally stable, solvent resistant organopolysiloxane comprising a plurality of eight membered rings of alternate silicon atoms and oxygen atoms, each of said silicon atoms being connected to one methyl radical and substantially every silicon atom of one of said eight membered rings being connected to a silicon atom of another of said eight membered rings through an ethylene radical, any valences of silicon not being accounted for above being satisfied by a member selected from the class consisting of hydrogen and vinyl radicals.

3. An optically clear, solid, resinous, thermally stable, solvent resistant organopolysiloxane comprising a plurality of eight membered rings of alternate silicon atoms and oxygen atoms, each of said silicon atoms being connected to one member selected from the class consisting of methyl radicals and phenyl radicals and substantially every silicon atom of one of said eight membered rings being connected to a silicon atom of another of said eight membered rings through a trimethylene radical, any valences of silicon not accounted for above being satisfied by a member selected from the class consisting of hydrogen and allyl radicals.

4. A solid, resinous organopolysiloxane comprising a plurality of eight membered rings of alternate silicon atoms and oxygen atoms, each of said silicon atoms being connected to one monovalent hydrocarbon radical free of aliphatic unsaturation and substantially every silicon atom of one of said eight membered rings being connected to a silicon atom of another of said eight membered rings through a divalent alkylene radical containing at least two carbon atoms, with any valences of silicon not accounted for above being satisfied by a member selected from the class consisting of hydrogen and monovalent hydrocarbon radicals containing olefinic unsaturation.

References Cited by the Examiner

UNITED STATES PATENTS

| | | | |
|---|---|---|---|
| 2,595,891 | 5/52 | Sauer | 260—46.5 |
| 2,721,873 | 10/55 | MacKenzie et al. | 260—46.5 |
| 2,823,218 | 2/58 | Speier et al. | 260—448.2 |
| 2,867,599 | 1/59 | Hurd et al. | 260—46.5 |
| 2,970,150 | 1/61 | Bailey | 260—46.5 |

MURRAY TILLMAN, *Primary Examiner.*

WILLIAM H. SHORT, *Examiner.*